United States Patent
Lines et al.

(10) Patent No.: US 6,798,870 B1
(45) Date of Patent: Sep. 28, 2004

(54) NON REAL-TIME FACSIMILE SYSTEM FOR A COMPUTING DEVICE

(75) Inventors: Lynnette Lines, Seattle, WA (US); Gordon G. Free, Freeland, WA (US)

(73) Assignee: Conexant Systems, Inc., Newport Beach, CA (US)

(*) Notice: Subject to any disclaimer, the term of this patent is extended or adjusted under 35 U.S.C. 154(b) by 619 days.

(21) Appl. No.: 09/898,640

(22) Filed: Jul. 3, 2001

(51) Int. Cl.[7] .............................................. H04M 11/00
(52) U.S. Cl. ........................... 379/100.09; 379/100.01; 358/407; 710/72
(58) Field of Search .................. 379/100.01, 100.06, 379/100.09, 100.11, 100.12, 100.17; 358/400–403, 407, 442–444, 468; 710/72

(56) References Cited

U.S. PATENT DOCUMENTS 5,404,231 A * 4/1995 Bloomfield ................. 358/400
6,370,239 B1 * 4/2002 Le et al. ................. 379/100.09

* cited by examiner

*Primary Examiner*—Wing Chan
(74) *Attorney, Agent, or Firm*—Christopher J. Rourk; Godwin Gruber, LLP

(57) ABSTRACT

The invention describes a non-real time fax transmission and reception system, in which fax emulation or "spoofer" software resides between application software and a fax/modem device. The fax/modem device may be comprised of hardware or software in any proportion. The fax spoofer software uses a fax/modem emulator to interface between requesting application software to have the application software believe that it is communicating with an actual, as opposed to virtual, fax/modem device. The emulator creates a class 1 or class 2 fax/modem session of the transmission request, which may be transmitted to a fax/modem device at a later point in time. Additionally, the fax spoofer software may be used to buffer, queue, or process incoming facsimiles, which can either be stored in the local memory of a fax/modem device or in the memory portion of the fax spoofer software. The incoming facsimile session is recorded in a buffer, and routed to the emulation software that processes the incoming fax/modem session into fax data deliverable to a destination application. Accordingly, incoming faxes need not interrupt the operation of the computing system. Additionally, temporary unavailability of system resources will not result in a termination of the facsimile session or failure of the transmission. The fax spoofer software may be located across several different computers in a networked environment. In a network environment, a fax/modem hub may be created to route incoming or outgoing facsimiles to different client computing systems. Storage or processing of the fax/modem sessions may take place either at the hub level or at the client level.

16 Claims, 12 Drawing Sheets

NON REAL-TIME FACSIMILE SYSTEM FOR A COMPUTING DEVICE

BACKGROUND

1. Technical Field

The present invention is directed to a dynamic facsimile ("fax") transmission system and method that enables the non-real time transmission of faxes from a computing device. More precisely, the present invention is directed to a non-real time or semi-real time fax transmission system and method in which the associated computing devices, either locally or across a network, emulate a class 1 or class 2 facsimile machine and modem, and store the emulated facsimile/modem sessions for transmission at a later time. The present invention is also directed to means by which a modem spoofer software component may be used in retrieving facsimile transmissions from either a facsimile/modem device, where the facsimile/modem session is stored in the fax/modem device or in a memory of the computing device.

2. Related Art

Many conventional computer systems employing a facsimile/modem device are connected to the fax/modem device by a single band-limited connection, such as a serial port. Attempts have been made to read or write class 1 or class 2 fax commands and data to an attached fax device over an IEEE 1284 parallel port on a designated extended capability port ("ECP") protocol. The ECP protocol provides a high performance bi-directional communication path between the first adapter and designated peripheral and, thus, provides both data cycle and command cycle paths in both forward and reverse directions.

Accordingly, using a parallel port is problematic if data traffic is travelling over the port on other channels. Additionally, the IEEE 1284 specification allows delays for signals to change, and additional time is needed to switch the ECP channel. These delays make it difficult to meet the real time requirements of class 1 or class 2 fax/modems in a personal computer ("PC")-based fax application.

Additionally, telephone lines or PC-to-fax communications often have limited bandwidths for response time, thereby making it difficult to send or receive a fax in real time using common fax applications, such as WinFax®, LaserFax®, or HotFax®.

The success or failure of any fax transmission based upon a simple dedicated PC-to-fax communication is dependent on the speed of the communication link between the PC and the fax device. Additionally, the success or failure of any fax transmission is dependent on the timing requirements of the associated fax application or any other embedded fax interface associated with another type of application, such as the "print-to-fax" options found in many popular software applications.

Finally, many conventional fax/modem devices do not have storage means for the fax data in the fax device when an attached PC is busy. Accordingly, an incoming fax will fail to transmit when the PC is busy and unable to upload the fax at the time of reception. Additionally, the PC will not be able to respond to the incoming fax reception at a later time, as the communication channel has been closed to the incoming reception.

Many other problems, disadvantages, and deficiencies of the prior art will become apparent to one skilled in the art after comparing such prior art with the present invention as described herein.

SUMMARY

Figure 1:
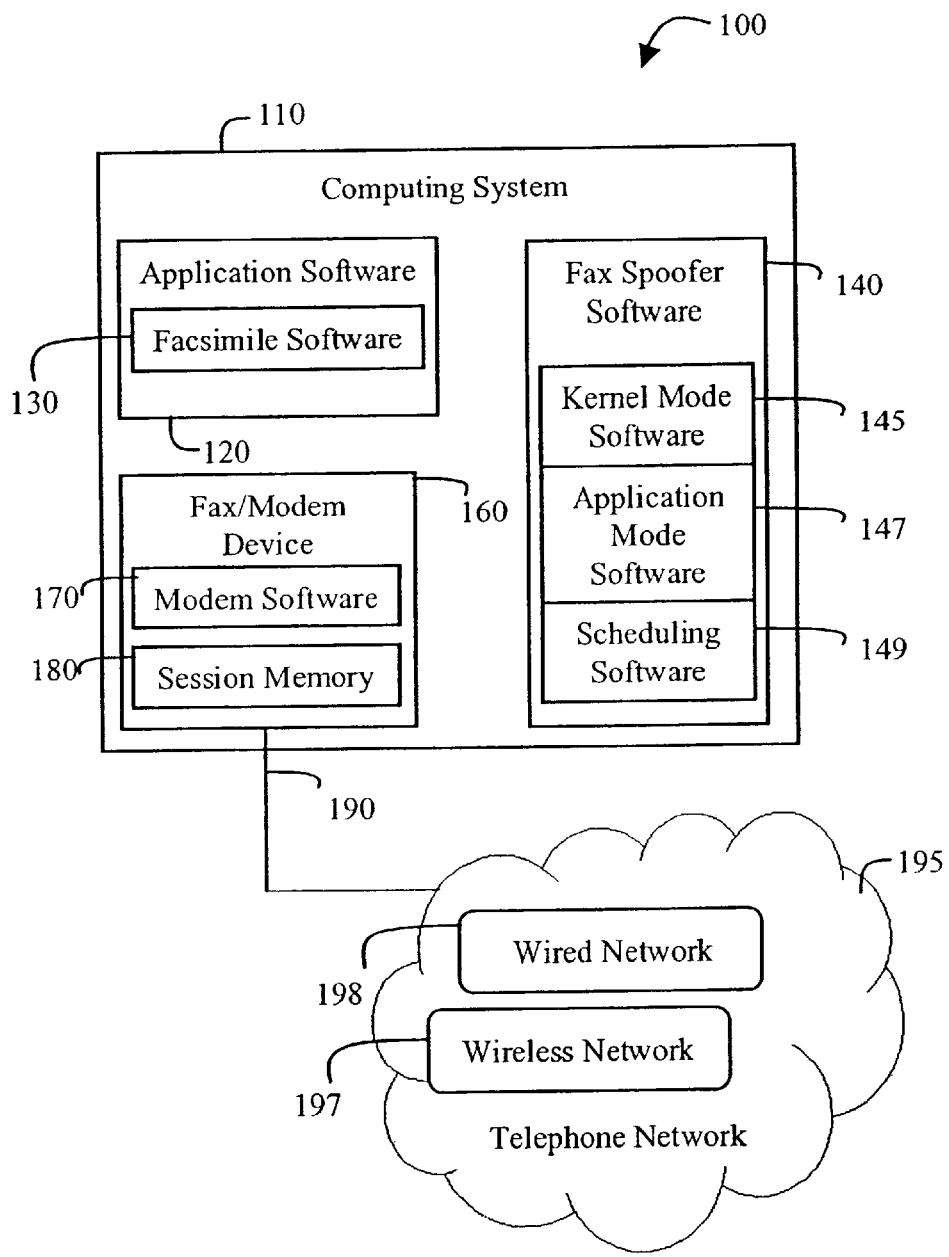
FIG. 1 is a schematic block diagram of a fax transmission and reception system built in accordance with the present invention.

Various aspects of the invention may be found in a facsimile system for a computer system. The facsimile system is communicatively coupled to a modem that is capable of acting as a facsimile device. The facsimile system may have several functional portions, including a computer system interface, a modem emulator, and a modem interface.

The computer system interface is communicatively coupled to the computer system and receives data for an outgoing facsimile transmission through the modem. The modem emulator is communicatively coupled to the computer system, and receives data from the computer system for transmission as a facsimile through the modem. The modem interface is also communicatively coupled to the modem emulator, and passes the data received by the modem emulator to the modem.

The modem emulator emulates a modem while receiving the data destined for the modem. Thus, to the computer system, it appears that the ongoing outgoing facsimile is being processed by the modem. In fact, the modem emulator is processing the outgoing facsimile transmission. In an exemplary aspect, the modem emulator has a class 1 or class 2 facsimile machine emulator, or both.

Another aspect of the facsimile system may be realized with a facsimile session queue. The facsimile session queue is communicatively coupled to the modem emulator, and stores the data received from the computer system for transmission.

The facsimile system may also have a scheduler. The scheduler is communicatively coupled to the modem interface. The scheduler directs the facsimile system when the outgoing facsimiles received from the computer system will be sent to the modem. The scheduler can base the point at which the facsimile data is transferred to the modem for transmission to a remote party on any of a number of preselected criteria.

For example, the scheduler may determine to send the facsimile data to the modem based on a number of facsimile messages to be sent. Or, the scheduler may base the transmission time on an amount of space left or an amount of space occupied in the stored session queue. Or the scheduler may have a preset time at which to transmit the facsimile data, or have preset delays.

Or, the facsimile system may store the data when the modem is otherwise occupied. When the modem is unoccupied, the transmission may then occur. In this manner, the facsimile system transmits the data to the modem at a later time than it receives the data from the computer system.

In another aspect of the invention, incoming data from other remote facsimile devices is stored. The storage may take place either in the facsimile system or elsewhere in the computer system. At a later time, the facsimile system enables the computer system to process such a facsimile. This may take place through the use of the modem emulator, as it may emulate a modem or facsimile device using the stored incoming data in communicating that data to the computer system.

Another aspect of the invention may be found in a method of operating a facsimile device on a computing system. The computing system is communicatively coupled to a modem. An interface would receive a request to transmit a facsimile from the computing system, and then check the availability of the modem to transmit the facsimile. The interface would then emulate a modem to computing system and transmit the facsimile at a later time.

In one aspect, the interface would check the availability of the modem through checking a scheduler to determine if the modem can send the facsimile at the time of the request. Or, the scheduler may operate as described previously in selecting the point of transmitting the data received from the computing system based on various preselected criteria.

Another aspect of the method may include receiving and storing the facsimile data in a session buffer. In this manner, many outgoing facsimiles may be stored for later transmission by the coupled modem.

In another aspect, the modem is communicatively coupled to the computing system over a network. As such, a modem hub may be made for one or more computing devices.

DETAILED DESCRIPTION

FIG. 1 is a schematic block diagram of a fax transmission and reception system built in accordance with the present invention. A facsimile transmission and reception system 100 comprising a computing system 110 is linked to a telephone network 195 through a communications link 190. The telephone network 195 may contain a wireless network 197 or a wired network 198.

The computing system 110 runs an application software component 120, and/or a facsimile interface software component 130. The application software may be any one of a number of popular applications, including Microsoft Word®, graphics applications, database applications, or other widely available software.

If the application software component 120 does not contain an integrated fax component, the computing system 110 contains the facsimile software 130, which allows the computing system 110 to send a facsimile of data files contained on the computing system to any of a number of recipients over the communications link 190, and through the telephone network 195. Or, the application software 120 may allow for the direct transmission of faxes from within the application software 120 in substantially the same manner.

Additionally, the computing system 110 may receive faxes. The facsimile software 130 allows the computing system 110 to receive faxes from remote senders through the communications link 190 and from the telephone network 195.

Both the application software 120 and the facsimile software 130 perform the functions described above via a fax/modem device 160. The fax/modem device 160 links the computing system 110 to the telephone network 195 through the communications link 190, which can be a variety of sources, including both wired and wireless connections.

The fax/modem device 160 need not be integral to the computing system 110, but may be communicatively coupled to the computing system 110 over many types of communication links. These communications links may be achieved through wired communications links over a serial port, parallel port, Universal Serial Bus ("USB") port, SCSI port, or through a wired network connection such as, for example, an Ethernet connection. Additionally, the fax/modem device 160 may be communicatively coupled to the computing system 110 through either a wireless radio communications link or through an infrared communications link.

Additionally, the fax/modem device 160 is not necessarily completely embodied in hardware components. The fax/modem device may be comprised of modem software 170 and hardware components, with the hardware portions and the software portion 170 located either within or without the computing system 110 or in any combination thereof.

The fax/modem device may contain a session memory portion 180 to which incoming transmissions may be buffered. Or, the fax/modem device may employ a portion of the memory of the computing system 110 to buffer incoming and outgoing transmissions.

In the non-real time fax transmission system and method, the user indicates to the facsimile software 130 that the user wishes to send a facsimile transmission to a remote user. The user enters the appropriate data through the facsimile software 130, typically telephone number, sender, recipient, and any additional messages that the user wishes to send to the remote recipient. The user may also select data files resident on the computing system 110 to be attached to an outgoing facsimile.

The facsimile software 130 sends the proposed facsimile to a fax spoofer software component 140. The fax spoofer software 140 then determines if the fax/modem device is currently busy or otherwise out of communication with the computing system 110. If the fax/modem device is unavailable, the fax spoofer device accepts the data provided by the facsimile software 130 and emulates the functions of a class 1 or class 2 fax/modem on the data provided by the facsimile software 130. Thus, the facsimile software 130 is unaware of the unavailability of the fax/modem device 160, and believes that it transmitting to an actual fax/modem device.

Similarly, the application software 120 communicates with the fax spoofer software 140 when a user wishes to send a document or data from the application software 120 to a remote user through the telephone network 195. Typically, the facsimile software 130 accesses other portions of the computing system 110 to create attachments to send to remote users. The user of the application software 120 typically wishes to simply send the contents of the user's current data file in the application software 120 through the fax/modem device to a remote user.

Similar to the method described above in relation to the facsimile software 130, the application software 120 communicates with the fax spoofer software 140. Thus, the fax spoofer software can capture an outgoing facsimile session destined for transmission over the telephone network 195 when the fax/modem device 160 is occupied or otherwise out of communication with the computing system 110.

If the fax/modem 160 is not in communication with the computing device 140, the fax spoofer software 140 parses modem commands from the requesting software and sends the correct responses back to the requesting software. The requesting software may be either the facsimile software 130 or the application software 120.

Thus, the fax spoofer 140 enables the requesting software to believe that it is communication with the actual fax/modem device 160 in real time. The fax spoofer program 140 parses modem commands, such as AT commands and other class 1 or class 2 fax commands, to enable the fax spoofer program 140 to respond correctly to the facsimile software.

The fax spoofer program 140 may contain a kernel mode WDM driver 145 and a user mode helper application 147. The kernel mode driver 145 of the fax spoofer program 140 may best be suited to monitor and capture data for a designated serial port associated with the fax/modem device 160, depending upon the type of operating system in use.

The kernel mode driver 145 of the fax spoofer program is communicatively coupled to the user mode helper program 147 of the fax spoofer software 140. The kernel mode driver 145 communicates with the user mode helper application 147 to transfer fax image data and control information (such as data format, phone number, etc.) between the kernel mode driver 145 and the user mode helper application 147. Once the fax data has been transferred to the user mode helper application 147, the fax data can be transmitted to the fax/modem device 160 immediately, or stored to be sent at a later time.

The fax spoofer software 140 may also have a scheduling mechanism 149, which allows the computing system 110 to send facsimiles at specified times and conserves system resources by allowing the user to send faxes efficiently.

During an incoming facsimile transmission, the incoming message is transmitted to the fax/modem device 160 from the telephone network 195 through the communications link 190. The fax spoofer software 140 monitors the fax/modem device 160 for incoming transmissions from a remote user. When a fax transmission request is detected, the fax spoofer software 140 then determines whether the computing system 110 is now able to receive and process a facsimile transmission.

The fax spoofer software 140 determines the availability of the communication connection between the fax/modem device 160 and the remainder of the computing system 110, determines the availability of the computing system 110, and determines whether the scheduling portion of the fax spoofer software 140 calls for an incoming transmission. If all of these conditions are met, then the facsimile reception proceeds.

If the fax/modem device 160 determines that either the connection between the fax/modem device 160 and computing system 110 or that the computing system 110 itself is unavailable, the fax/modem device 160 can store the entire fax/modem session in an attached session memory 180. The session memory 180 may be local to the computing system 110, local to the fax/modem device 160, or be allocated in any proportion between the computing system 110 and the fax/modem device 160.

If the attached session memory 180 is local to the fax/modem device 160, the fax/modem device 160 transfers the contents of the session memory 180 to the fax spoofer software 140 at the appropriate time. The fax spoofer software 140 then stores the contents of the session memory 180. The fax spoofer software 140 may process the data into an incoming facsimile on a non real-time basis or the fax spoofer software 140 may interface to the application software 120 or the facsimile software 130 as an emulator according to the data.

When the attached session memory 180 is local to the computing system 110, the fax/modem device 140 transfers the contents of the facsimile session to the facsimile session memory 180. The fax/modem device 160 may store some of the session data for later transmittal to the computing system 110 at a slower speed, thereby allowing the computing system 110 to focus on its ongoing operations without having to copiously oversee the operation of the fax/modem device 160.

The fax spoofer software 140 may store the contents of the session memory 180 for processing into an incoming facsimile on a non real-time basis. Or, the fax spoofer software may act as a modem emulator relative to the application software 120 or the facsimile software 130.

When the scheduling mechanism 149 will not allow for the transmission and processing of an incoming fax from the fax/modem device 160, the fax/modem device 160 can transfer the recorded session directly to the fax spoofer software 140. The fax spoofer software 140 then processes the incoming fax in the appropriate manner.

Or, if the fax/modem device 160 contains an amount of session memory 180, the fax spoofer software 140 may indicate to the fax/modem device 160 to store all sessions in the session memory 180. This data would be stored until the scheduling parameters of the fax spoofer software 140 allow an upload of fax sessions to the fax spoofer for further processing.

Accordingly, received faxes may be stored in the fax/modem device 160 until the computing system 110 is available to upload the faxes, which allows the user to employ one of the commonly available fax applications to upload received faxes from the fax/modem devices 160. The user does not have to resort to custom designed software specific to a particular fax/modem device 160. Software developers also will not need to generate custom fax applications for each additional fax/modem device or associated application software, thereby saving development time for all concerned.

Outgoing faxes may also be spooled and sent to the fax/modem device 160, which allows for additional economy of resources because the application software 120 and the facsimile software 130 will be insulated from the operations of the fax/modem device 160. This further economizes telephonic resources because outgoing facsimiles can be spooled and sent in a batch, rather than intermittently.

Additionally, the success or failure of fax transmissions is now independent of the speed of the communications link 190 between the computing system 110 and the fax/modem device 160 and is independent of the timing requirements of the facsimile software 130 or the application software 120. The user can again use one of the commonly available fax applications, rather than being forced to obtain a specific fax application for a specific fax/modem device 160.

Outgoing fax data and control information can also be stored in the computing system 110 to be sent at a later time at the user's convenience. Similarly, received fax data may be stored on the fax/modem device 160 until the computing system 110 has the resources available to upload the data. Thus, the fax will not fail if the computing system 110 is unable to upload the fax data at the time of reception.

In certain circumstances, the fax/modem device 160 will be able to upload the facsimile session directly to the fax spoofer software 140 and to the computing system 110 for later processing by the fax spoofer software 140 to a facsimile. Or, the fax spoofer software 140 may act as a modem emulator to an application program requesting the facsimile as stored in the session memory 180. Again, the fax will not fail if the computing system 110 is unable to upload fax data at the time of reception.

Many computing systems may use several fax/modem devices for communication. Accordingly, the depiction of the fax/modem device 160 represents either one or a plurality of such devices, each with a link to the telephone network 195. These multiple modems may be used independently thereby linking several different remote users to a single computing device, in conjunction with each another in a "shotgun modem" configuration, or in feasible combination.

Figure 2:
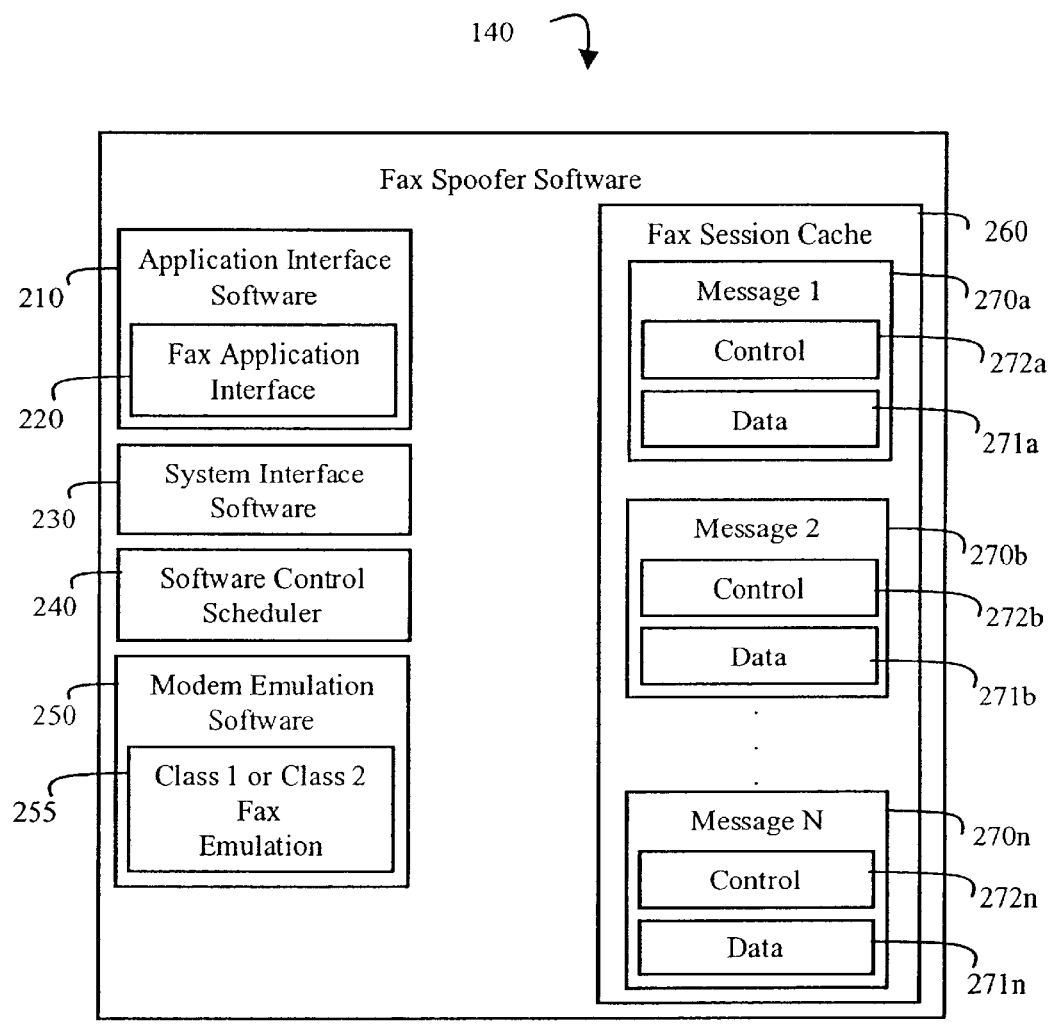
FIG. 2 is a functional block diagram of the fax spoofer software of FIG. 1.

FIG. 2 is a functional block diagram of the fax spoofer software 140 of FIG. 1. The fax spoofer software 140 contains an application interface software component 210 and a fax application interface component 220. Together, the components 210 and 220 correspond to the application mode software 147 depicted in FIG. 1. The fax spoofer software 140 communicates with user level applications through the application interface software 210 and the fax application interface 220. Typically, the associated application interface software 210 and the fax application 220 interfaces that communicate with the fax spoofer software 140 will do so blindly, that is, the application interface software 210 or the fax application interface 220 does not realize that it is communicating with an emulator for a fax/modem device 160 (FIG. 1).

The fax spoofer software 140 may also contain a system interface software component 230, which allows the fax spoofer software 200 to communicate directly with an operating system to request functional calls or transmissions from the operating system. The system interface software component corresponds to the kernel mode software 145 depicted in FIG. 1.

The fax spoofer software 140 also contains a software control scheduler component 240, which corresponds to the scheduling software 149 of FIG. 1. The software control scheduler 240 allows a user to schedule times to poll the session memory 180 depicted in FIG. 1 for incoming faxes, or to schedule times to send outgoing faxes, thereby allowing a user to efficiently customize the computing system 110 (FIG. 1) and communication links from the user's computing device to the external environment.

The software control scheduler 240 may also communicate with other computers and have entries for those computers. Remote computers schedule parameters for associated computers, essentially making the computer running the fax spoofer software 140 a facsimile "hub" for the other remote computing devices. Thus, the fax spoofer software 140 may allow a single fax/modem computing system to act as a fax/modem hub serving many remote users, for both transmission and reception.

With the multiple modems described above in relation to FIG. 1, the computing system 110 may be linked to numerous other computing systems. Accordingly, with either one or several fax/modem links, a computing system 110 employing the fax spoofer software 140 depicted in FIGS. 1 and 2 may serve as a fax/modem hub for other linked computing systems.

The fax spoofer software 140 also contains a modem emulation software component 250. The modem emulation software 250 may contain a class 1 or class 2 fax emulation software component 255, or both class 1 and class 2 fax emulation components, depending upon the particular configuration of the fax/modem device 160. Fax requests originating from a computing system 110 are routed to the modem emulation software 250. If the attached fax/modem devices are unavailable, the fax data is stored in the computing system 110. The modem emulation software 250 parses the incoming modem data requests into data and control sets. Thus, the modem functionality is accomplished in either real-time or semi-real time, which allows an outgoing transmission that would otherwise fail to transmit successfully at a later time, to transmit regardless of a com-link's timing requirements or to transmit whether or not the firmware has implemented class 1 or class 2 protocols.

The fax spoofer software 140 also contains a fax cache 260. The fax cache 260 contains a slot 270a for a "Message 1." The slot 270a contains a data slot 271a and a control slot 272a. In a similar fashion, the fax cache 260 contains a slot 270b for a "Message 2", which contains a data slot 271b and a control slot 272b; and so on, up to a slot 270n for a "Message N" that contains a data slot 271n and a control slot 272n. Thus, when the modem emulation software 250 interacts with an external facsimile application or any other application attempting to transmit a facsimile, the modem emulation software 250 separates the session into data and control portions. The facsimile message is then stored in a slot in the fax cache 260. The various components are stored in the appropriate control and data slots within the appropriate message slot in the fax cache 260.

Multiple message slots are available in the fax cache 260, thereby allowing for the efficient queuing, buffering and spooling of multiple incoming and outgoing facsimiles.

When an incoming facsimile is routed from the fax/modem device 160 to the fax spoofer software 140, the fax spoofer software 140 determines if the associated computer system 110 can process the incoming fax at the present time. That is, the computing device 110 may be busy, appropriate fax software may not be running, auto-answer may be turned off, or the software control scheduler 240 may have enabled fax spooling.

If the computing system 110 is not able to handle the incoming reception, the fax spoofer software 140 will upload the communication session from the associated fax/modem device into one of the message slots in the fax cache 260. Both incoming and outgoing facsimiles may be buffered, queued and spooled because the fax session cache 260 can store both incoming and outgoing fax data simultaneously. If desired, separate fax session caches may be employed; or the fax spoofer software 140 may instruct the fax/modem device 160 to print the incoming fax.

Figure 3:
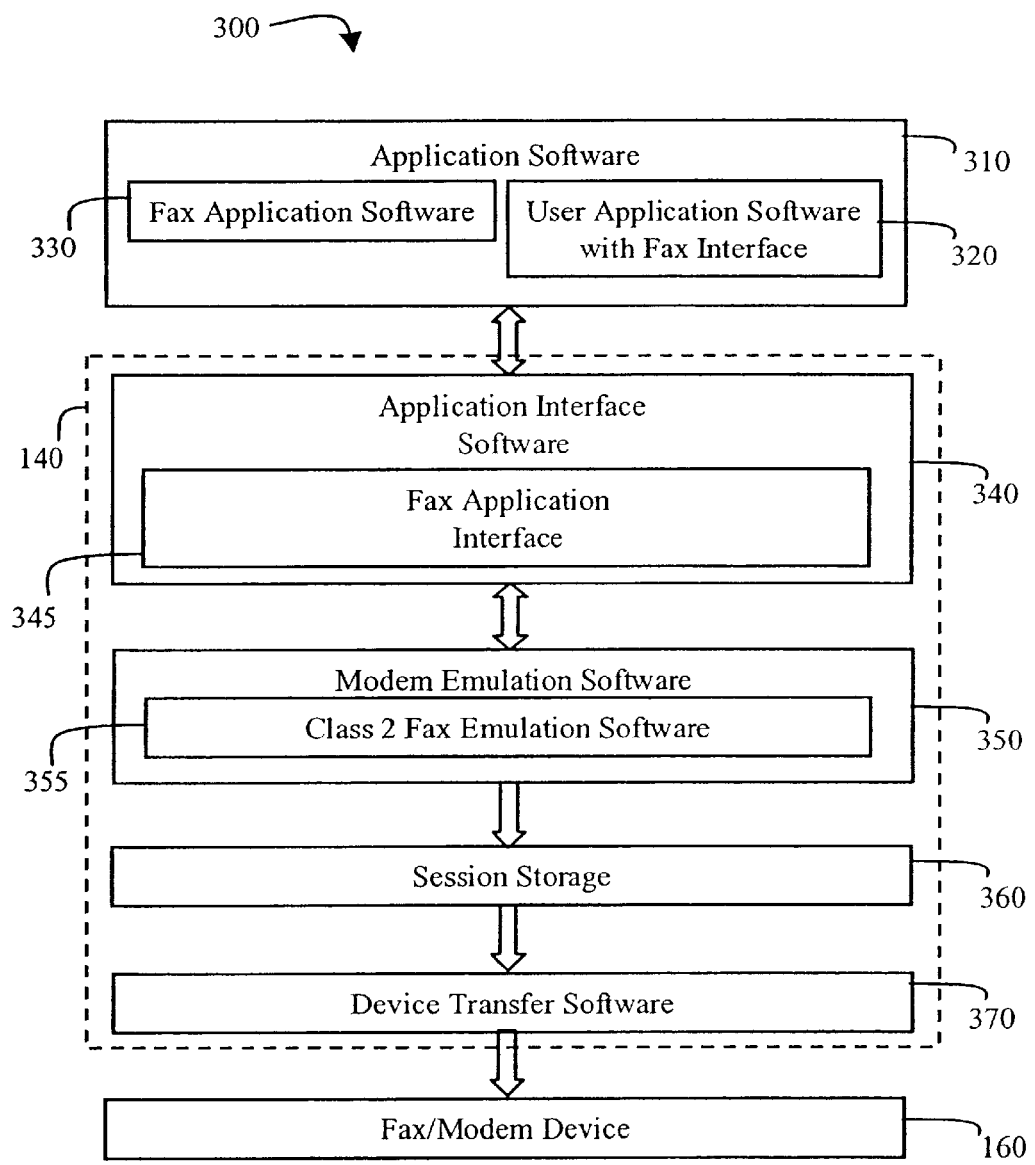
FIG. 3 is a combination flow diagram and functional block diagram describing the possible components of the fax spoofer software of FIG. 1.

FIG. 3 is a combination flow diagram and functional block diagram 300 describing the possible components of the fax spoofer software 140 of FIG. 1. The computer system 110 employs application software 310. The application software 310 may include a direct fax application software component 330 and a user application software with fax interface component 320.

The computing system 110 can communicate with the fax spoofer software 140 when the fax/modem device 160 is unavailable, which may be accomplished through an application interface software component 340 and a fax application interface 345. Typically, the application interface software component 340 and the fax application interface 345 do not realize that they are communicating with an emulator for a fax/modem device.

Facsimile data flows from the application software 310 to the application interface software 340, which may be accomplished via any method or device that mimics the operation of the fax/modem device 160. For example, in a Microsoft Windows® operating system environment this may be accomplished through the use of an interface such as a VCOMM-type interface or a TAPI-type interface.

The fax application software 330 and user application software with fax interface 320 believe that they are in communication with an actual fax/modem device. As such, data flows from the application software 310 to the fax/modem spoofer software 140 through the application interface software 340.

Typically, the application software 310 sends class 1 or class 2 fax/modem commands to the specified fax/modem device 160. Because the application software 310 has accessed a fax/modem device, albeit one that emulates and stores the commands, including AT commands for the fax/modem, data is transmitted between the application interface software 340 and a modem emulation software component 350.

The modem emulation software 350 sends appropriate responses from the attached fax/modem device 160 back to the application software 310. This occurs while the modem emulation software 350 is capturing and storing the fax/modem commands from the application software 310. The modem emulation software 350 may contain software, including a class 1 or class 2 fax emulation software component 355, that enables it to successfully emulate the activities of attached fax/modem devices.

To the application software 310, the fax/modem spoofer software 140 appears to be a typical class 1 or class 2 fax/modem, that is, the modem emulation software 350 acts as a virtual fax/modem. At this point, a bi-directional communication channel is open between the application software 310 and the modem emulation software 350.

The modem emulation software 350 communicates a session log of the requested fax transmission, including both data and control signals to a session storage 360. The fax transmission, as well as any number of outgoing transmissions, may be stored for later transmission to the currently unavailable fax/modem device 160 for eventual delivery over an available telephone network.

At the appropriate time the fax/modem spoofer software 140 transfers the stored transmission sessions from the session storage 360 to the fax/modem device 160 through an appropriate device transfer software component 370. The criteria for the fax/modem spoofer software 140 transfer the stored transmission sessions from the session storage 360 may include the amount of data in the session storage 360, the availability of the fax/modem device 160, the availability of the communications link between the fax/modem spoofer software 140 and the fax/modem device 160, or a user-specified schedule.

Figure 4:
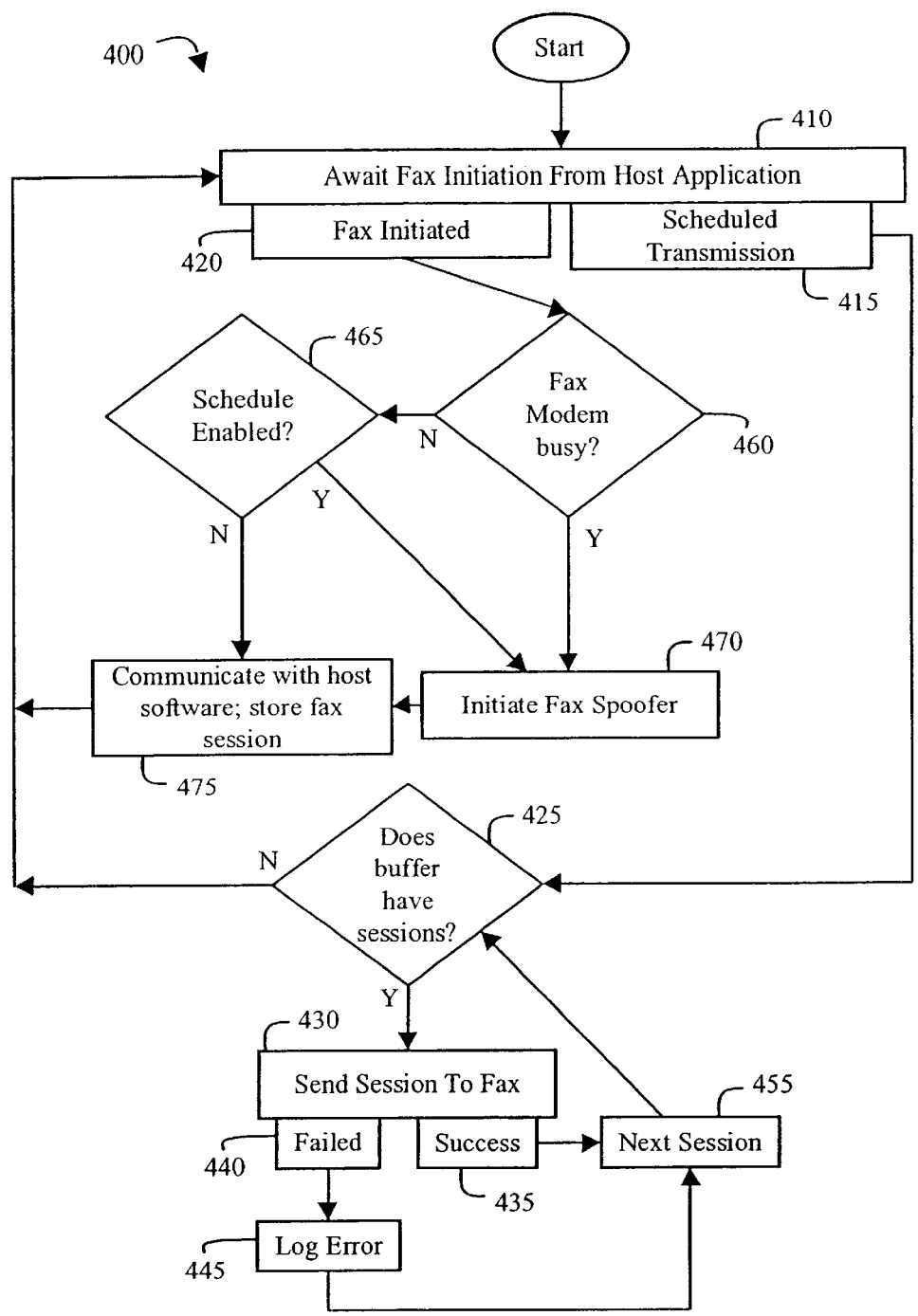
FIG. 4 is a data flow diagram of the possible operation of the fax spoofer software of FIG. 2.

FIG. 4 is a data flow diagram 400 of the possible operation of the fax spoofer software 140 of FIGS. 1–3. Control proceeds from a Start block to a block 410 in which the fax spoofer software 140 awaits an indication that a fax has been initiated from a host application. Once the fax has been initiated, control proceeds to a block 420 and then immediately to a block 460 in which the fax spoofer software 140 determines whether the associated fax/modem device 160 is busy. This determination in block 460 may involve deciding whether the connection to the fax/modem device 160 is available, whether a non-standard communication link, such as a USB or an IEEE 1284 parallel port connection, is being employed, or whether the fax/modem device 160 is engaged in other tasks, such as transmitting or receiving a fax, or serving as a fax/modem to the computing system 110.

If the fax spoofer software 140 determines that the fax can not be transmitted to the fax/modem device 160 on a real-time basis from the application software initiating such a request, then control proceeds to a block 470 in which the fax spoofer software 140 initiates a fax spoofer emulation. The fax spoofer software 140 may be configured to handle all faxes regardless of whether or not the fax/modem device 160 is available on a real-time basis. In this configuration, the fax/modem device 160 does not need to implement either class 1 or class 2 protocols and is thus can be simpler, and perhaps cheaper, than a typical fax/modem device. Control then proceeds to a block 475 in which the fax spoofer software 140 communicates with the host software and stores a fax session for later transmission to the associated fax/modem device 160.

The sessions created by the emulator software may be stored in a queue, allowing for the storage of multiple incoming or outgoing facsimile sessions. After creating a stored version of a facsimile session and the destination phone number of the session, control proceeds to the block 410 in which the fax spoofer software 140 resumes awaiting a fax initiation.

If in the block 460 the fax/modem 160 is not busy, control proceeds to a block 465 in which the fax spoofer software 140 determines whether any scheduling has been enabled. If a schedule is enabled for the fax/modem and computing system, control transfers to the block 470 and then immediately to block 475 in which the fax spoofer software 140 emulates a fax/modem session with the host software. The fax spoofer software 140 then creates and stores a fax session for later transmission to the associated fax/modem device 160. Control again returns to the block 410 to await a fax initiation.

If in the block 465, the fax spoofer software determines that scheduling has not been enabled, control proceeds to a block 475 in which the fax spoofer software 140 simply connects the requesting application software with the host software.

In block 410, while awaiting fax initiation, the fax spoofer software 140 may determine that the stored fax/modem sessions are to be transferred to the associated fax/modem device 160 through the use of a preset schedule as indicated by a block 415. In this case, when a transmission of the fax sessions is scheduled, control transfers to a block 425 in which the fax spoofer software determines if any fax sessions are buffered for transmission at that time. If no sessions are currently stored for later transmittal, the fax spoofer software simply returns to the wait state in block 410.

If the fax spoofer software 140 has fax sessions stored for transmission to the associated fax/modem device 160, control proceeds to a block 430 in which the fax spoofer software 140 sends a fax/modem session to the fax/modem device 160. If the session is transmitted successfully, as indicated in a block 435, then control proceeds to a block 455 in which the fax spoofer software 140 attempts to retrieve any other sessions present in the buffer for transmittal to the fax/modem device 160. Control returns to the block 425 to determine if another session is present in the buffer.

If no other fax/modem sessions are stored, control returns to block 410 in which the fax spoofer software 140 resumes waiting. If other fax/modem sessions are present, control proceeds to block 430 in which the fax spoofer software 140 communicates the next fax/modem session to the fax/modem device 160. This process continues until all the stored sessions are transmitted.

If, in block 430, a session is not properly transmitted to the fax/modem device 160, as indicated by a block 440, control proceeds to a block 445 in which the fax spoofer software 140 logs an error. Control then proceeds to block 455 in which the fax spoofer software 140 attempts to access the next stored session.

Figure 5:
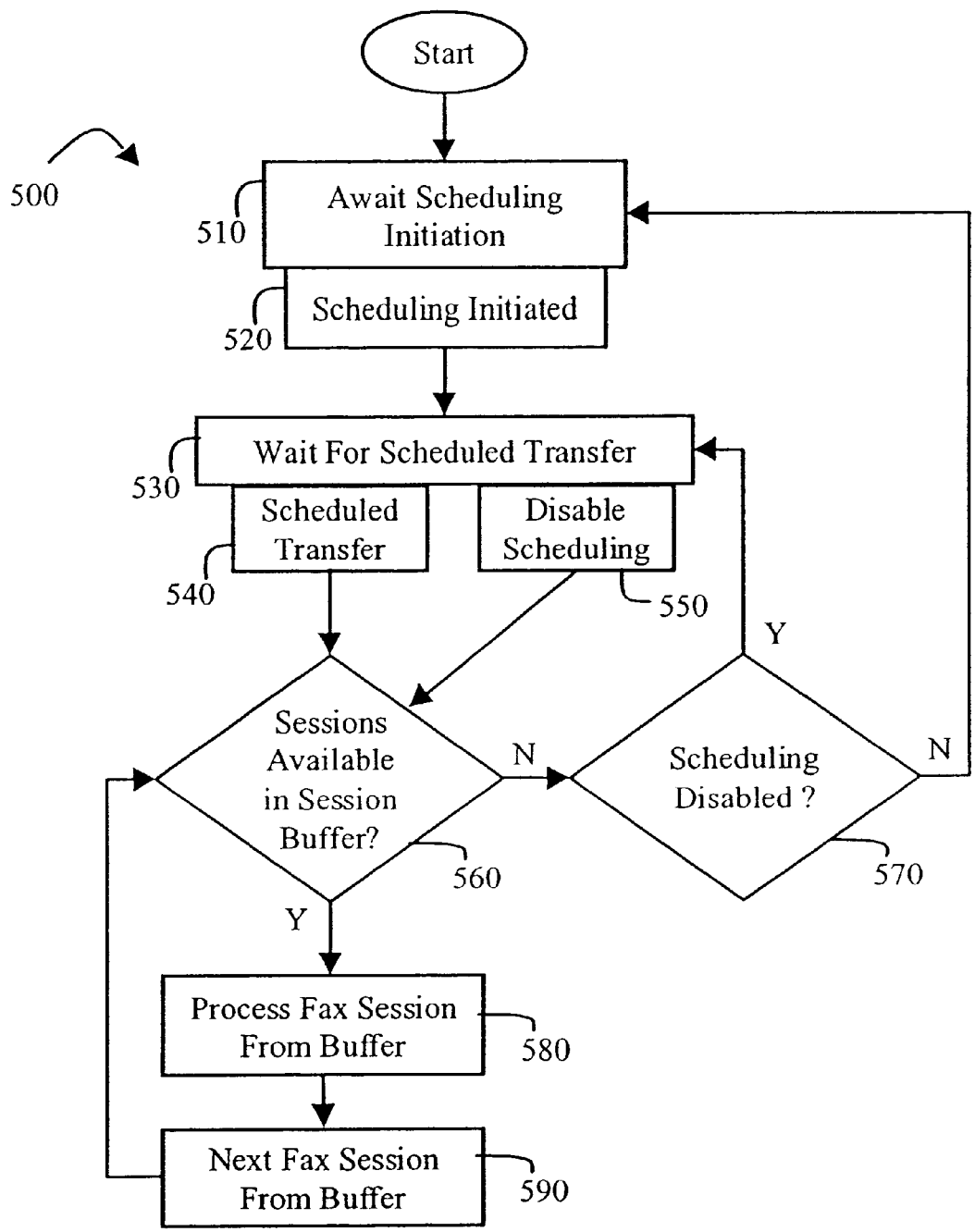
FIG. 5 is a flow diagram detailing the operation of scheduled transmissions of stored facsimile sessions by the fax spoofer of FIG. 2.

FIG. 5 is a flow diagram 500 detailing the operation of scheduled transmissions of stored facsimile sessions by the fax spoofer of FIG. 2. In the computer system 110 of FIG. 1, control proceeds from a Start block to a block 510 in which the fax spoofer software 140 awaits an initiation of fax scheduling or spooling. If no fax scheduling is initiated, the scheduler may transmit fax/modem sessions to an attached fax/modem device upon either request by an application or by communication through polling techniques.

Control then proceeds to a block 520 in which scheduling of fax sessions is initiated, and the fax spoofer software 140 intercepts and processes all fax sessions and stores the sessions in a buffer or queue, as described above, until the scheduled time for transmission as indicated in a block 530, in which the spooling mechanism of the fax spoofer software 140 waits until the scheduled transfer time.

If, as indicated in a block 540, the fax spoofer software 140 determines that it is time to send the spooled faxes contained in the fax session queue, control proceeds to a block 560. In block 560, the fax spoofer software 140 determines whether any fax/modem sessions are available to transmit to the fax/modem device 160.

If fax/modem sessions are present for transmission to the associated fax/modem device 160 in the fax session queue, control then proceeds to a block 580 in which the fax session is transmitted to the appropriate fax/modem device 160, from which the fax data is subsequently sent to a remote party. Control then proceeds to a block 590 in which the next available outgoing fax/modem session in the fax session queue is selected, and control then proceeds to the block 560 to determine whether the next selected session is a valid session for transmittal to the associated fax/modem device 160.

If no further sessions are available in the fax session queue, then control proceeds to a block 570 in which the fax spoofer software 140 determines whether the fax scheduling has been disabled in the interim. If the fax scheduling has been disabled, then control reverts to the block 510 in which the fax spoofer software 140 simply awaits the initiation of the fax scheduling. If the scheduling mechanism has not been disabled, control reverts to the block 530, in which the fax spoofer software 140 simply intercepts any outgoing fax transmissions for later transmittal to the fax/modem device 160.

If, in the block 530, the fax spoofer software 140 receives a signal to indicate that the fax scheduling is to be disabled, as indicated in a block 550, control proceeds to the blocks 560, 570, 580 and 590 in which the fax spoofer software 140 functions as explained above.

Figure 6:
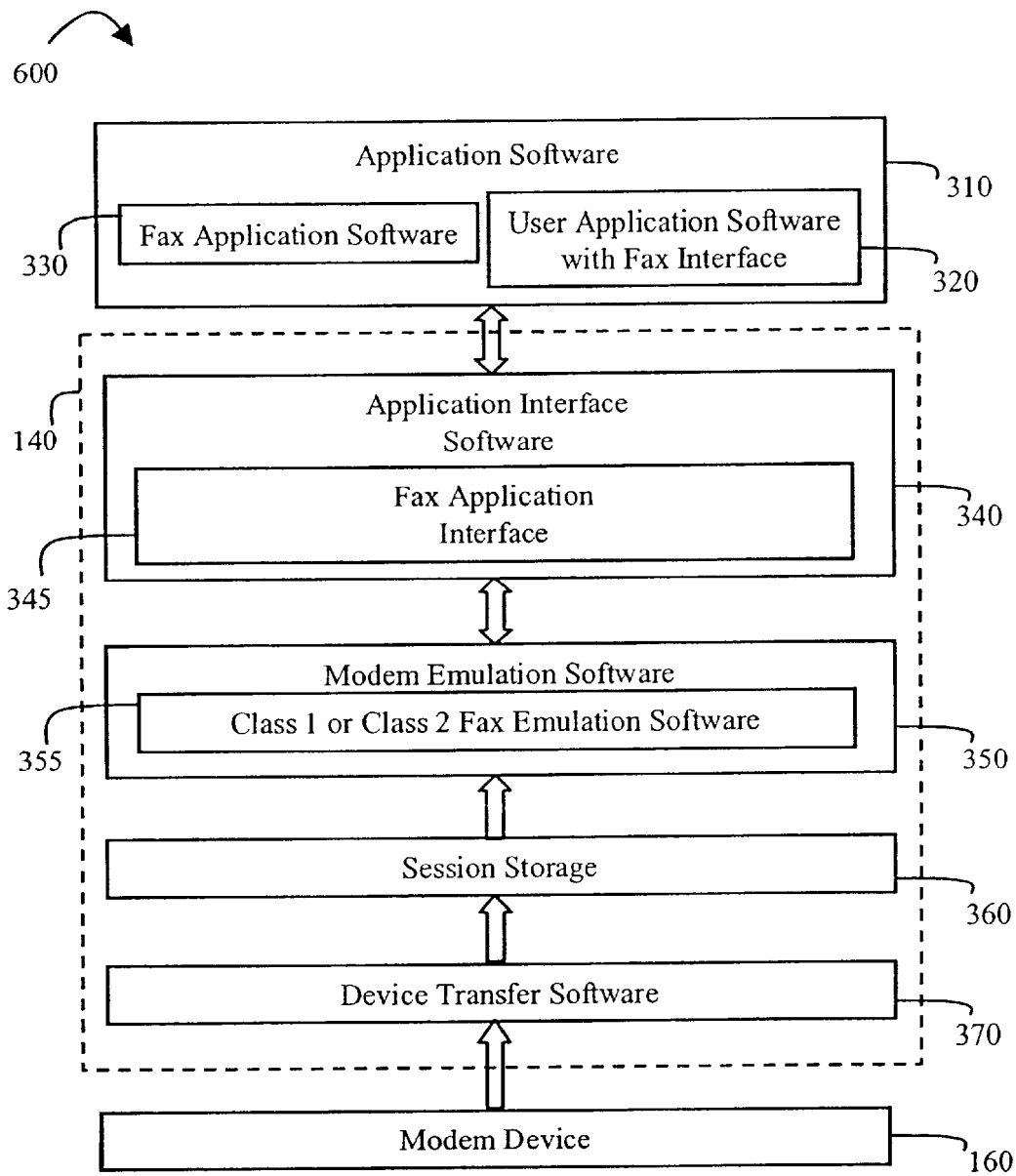
FIG. 6 is a combination flow diagram and functional block diagram describing the possible components of the fax spoofer software of FIG. 1 during the receipt of an incoming facsimile from a fax/modem device.

FIG. 6 is a combination flow diagram and functional block diagram 600 describing the possible components of the fax spoofer software 140 of FIG. 1 during the receipt of an incoming facsimile from the fax/modem device 160. An incoming facsimile is typically detected by the fax/modem device 160 and the fax/modem device 160 then initiates communication with the fax spoofer software 140.

The fax spoofer software 140 retains communication to the fax/modem device 160 through the device transfer software component 370 (FIG. 3). In this instance, the fax/modem session is stored to the session storage 360. The fax/modem device 140 may buffer incoming data for a period of time before transmitting all of the data to the session storage 360 in an intermittent manner, thereby minimizing timing problems often associated with non-standard communications links.

At a later time, the fax spoofer software 140 initiates full communication with the ultimate recipient of the facsimile, namely the application software 310, which again may be the facsimile application software component 330, or the user application software with fax interface component 320.

The fax spoofer software 140 communicates with the application software 310 via the application interface software component 340 and the fax application interface 345, described above in conjunction with FIG. 3. The modem emulation software component 350 operates on fax/modem sessions stored in a session storage 360. The modem emulation software 350 may contain software, including a class 1 or class 2 fax emulation software component 355, that enables it to successfully emulate the activities of the attached fax/modem devices. To the application software 310, the modem emulation software appears to be a fax/modem device. The facsimiles stored in the session storage 360 are relayed to the recipient application software 310 in a dynamic, non-real time manner, without having the facsimile transmission fail due to the unavailability of system resources or because of delays in the communication line.

Figure 7:
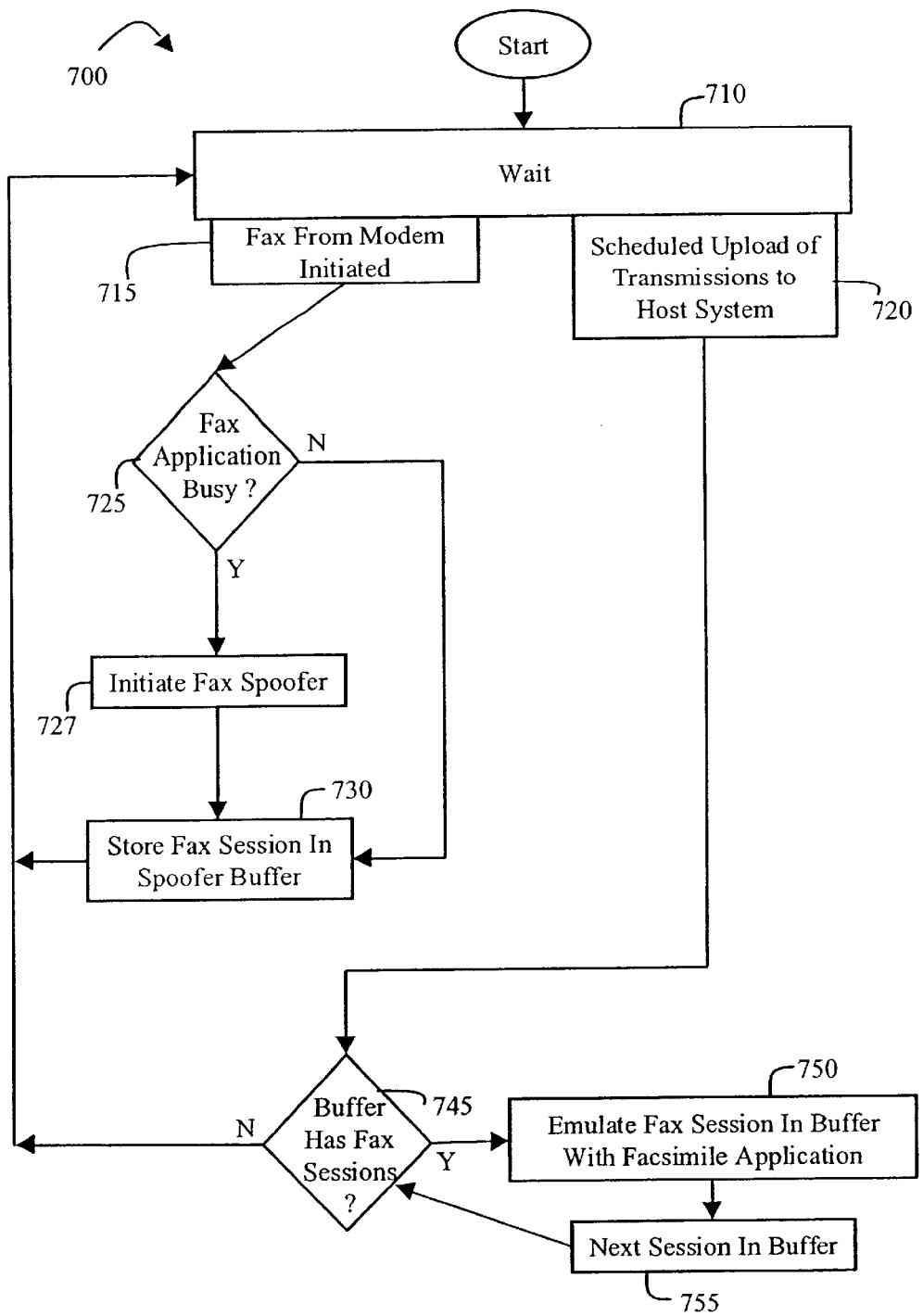
FIG. 7 is a data flow diagram of an additional possible operation of the fax spoofer software of FIG. 2.

FIG. 7 is a data flow diagram 700 of an additional possible operation of the fax spoofer software 140 of FIGS. 1–3. Control proceeds from a Start block to a block 710 in which the fax spoofer software 140 awaits an indication that a fax has been initiated by an attached fax/modem device 160. After the fax has been initiated from a fax/modem device 160, as indicated in a block 715, control proceeds to a box 725 in which the fax spoofer software 140 determines whether the associated application is busy. This determination may involve deciding whether the connection to the fax/modem device 160 is available, whether a non-standard communications link, such as a USB connection or an IEEE 1284 parallel port connection, is being employed, or whether the computing device 110 simply can not process the incoming fax on a real time basis. The computing device may also be configured to handle all incoming faxes through the fax spoofer software 140 because the fax/modem device 160 would not then need to implement either the class 1 or class 2 protocols.

If the fax spoofer software 140 determines that the fax can not be transmitted to the computing device 110 on a real time basis or the fax spoofer 140 is configured to handle all faxes, control proceeds to a block 727 in which the fax spoofer software 140 initiates a fax spoofer emulation. Control then proceeds to a block 730 in which the fax spoofer software 140 communicates with the fax/modem device 160. In block 730, the emulation software 250 of the fax spoofer 140 creates and stores a fax session for later communication to the computing device 110.

The sessions created by the emulator software 250 may be stored in a queue, allowing for the storage of multiple incoming or outgoing facsimile sessions. After storing a version of a facsimile session, control proceeds to block 710 in which the fax spoofer software 140 resumes waiting for a fax initiation.

If in box 725, the fax/modem is not busy, control transfers to the block 730, in which the fax spoofer software 140 emulates a fax/modem session for the incoming data. The fax spoofer software 140 creates and stores a fax session for later transmission to an associated fax/modem device 160. Control then returns to block 710 to await another fax initiation.

In the block 710, while awaiting an action, the fax spoofer software 140 may determine that the stored fax/modem sessions are to be transferred to the computing device 110 through the use of a preset schedule, as indicated in a block 720. When transmission of the fax sessions is scheduled, control proceeds from block 720 to a block 745 in which the fax spoofer software 140 determines if any fax sessions are buffered in the computing system 110. If no sessions are currently stored, control proceeds to block 710 in which the fax spoofer software 140 simply returns to the wait state.

If, in block 745, the fax spoofer software 140 has any stored fax sessions for transmission to recipient application software, control proceeds to a step 750 in which the fax spoofer software 140 emulates a fax/modem session to the fax/modem device 160. Control then proceeds to a block 755 in which any additional fax/modem sessions are retrieved and a determination is made as to whether any fax sessions were stored while control was in the block 745. Accordingly, all incoming facsimiles are either routed to the appropriate application software on the computing device 110 or stored for later processing.

Figure 8:
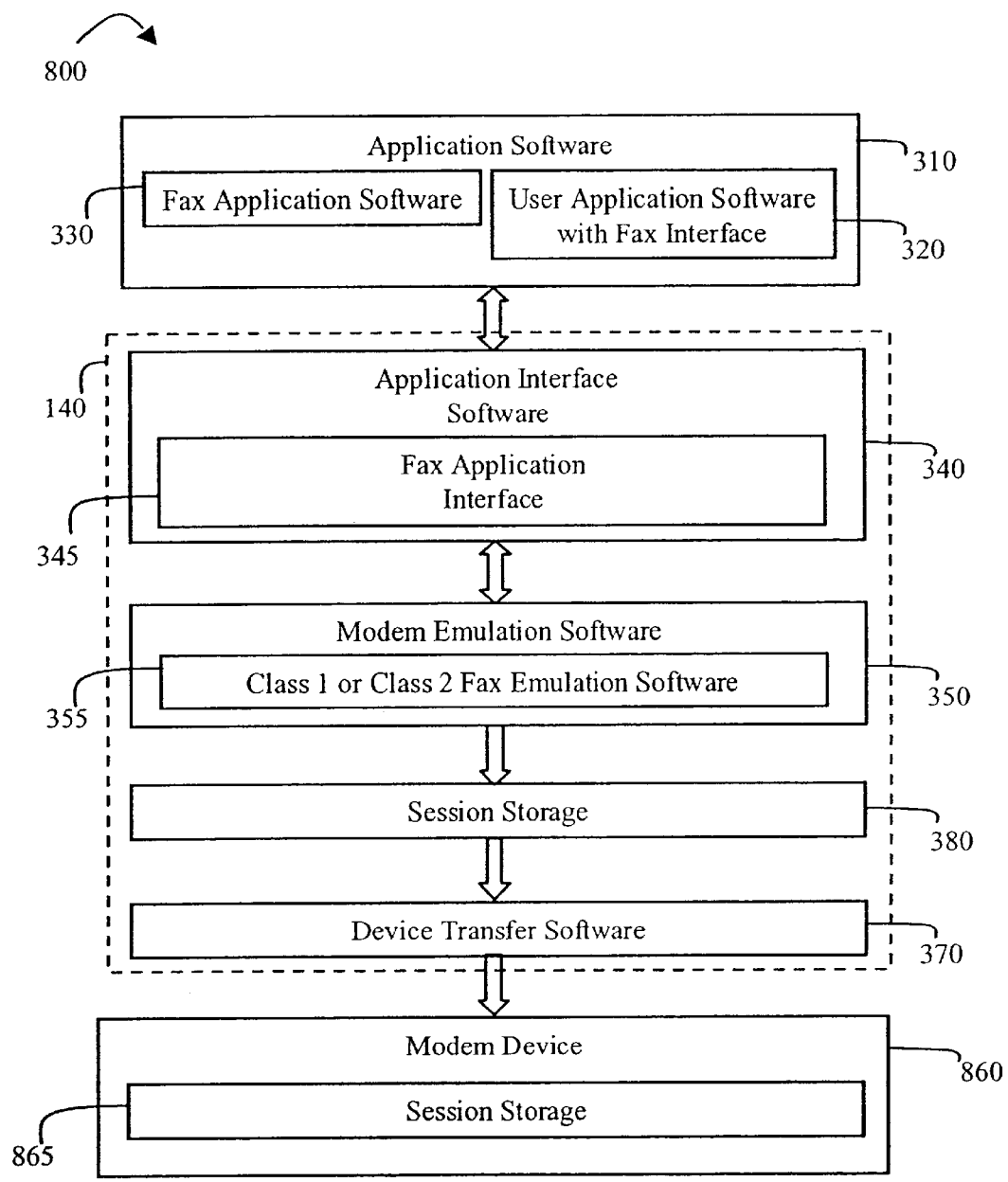
FIG. 8 is a combination flow diagram and functional block diagram describing additional possible components of the fax spoofer software of FIG. 1.

FIG. 8 is a combination flow diagram and functional block diagram 800 describing additional possible components of the fax spoofer software 140 of FIGS. 1–3. The corresponding details of the diagram 800 are substantially similar to the details described in relation to FIGS. 3 and 6 above, with the additional feature of the computer system 110 being able to interact with a resident memory device 865 in a fax/modem device 860.

The communications with the application software and the emulation of the fax/modem are the same as detailed in relation to FIG. 3 above. But, when the outgoing transmission is stored, the session may be dynamically stored to either a session storage 380 or a modem session storage 865. Thus, the system described in FIG. 8 may dynamically interact with the fax/modem device 860 when encountering non-standard communications techniques or intermittent communications problems. The fax/modem may process and transmit the data stored at either session storage location.

Figure 9:
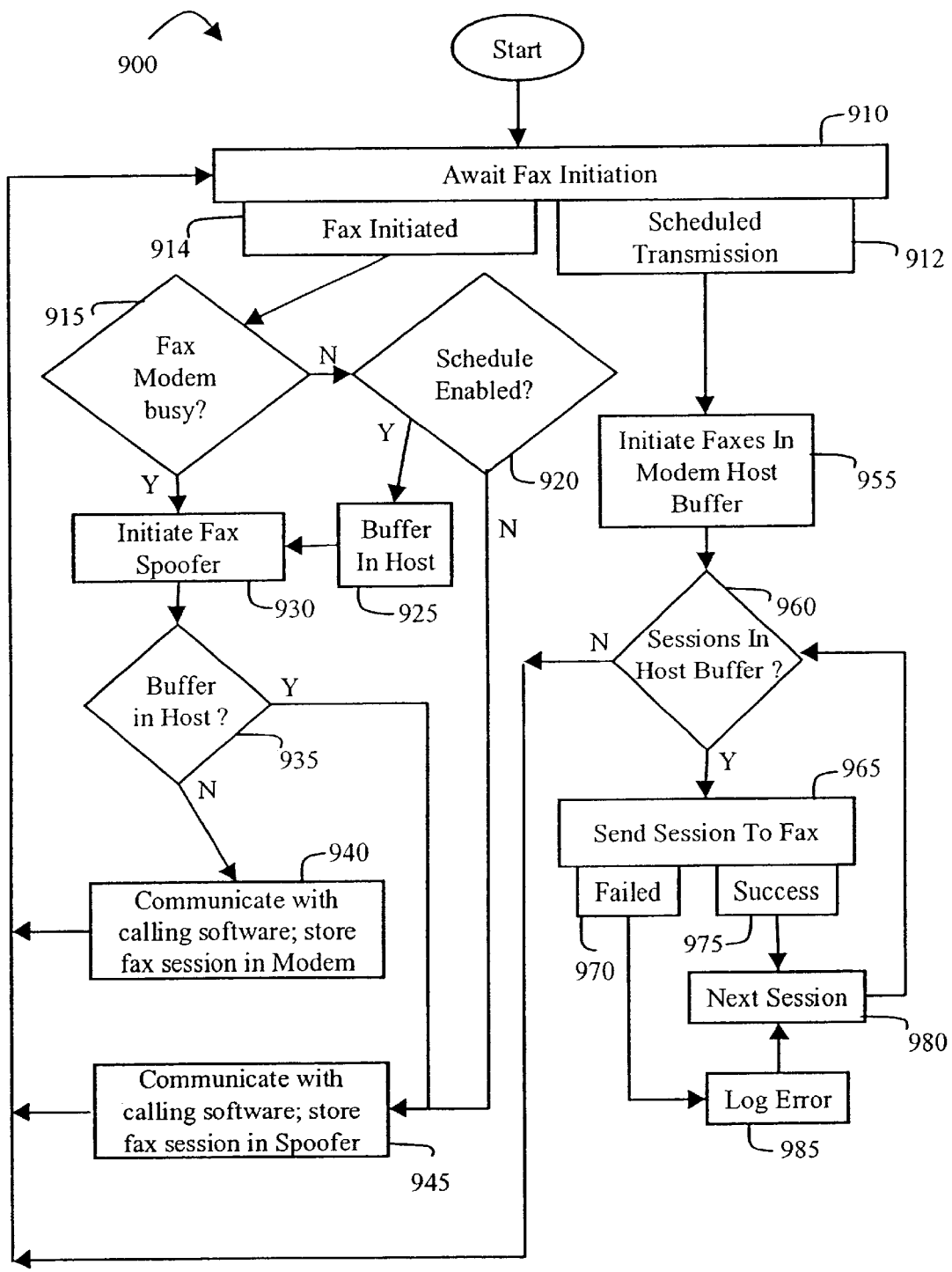
FIG. 9 is a data flow diagram of the possible operation of the fax spoofer software of FIG. 8.

FIG. 9 is a data flow diagram 900 of the possible operation of the fax spoofer software 140 of FIGS. 1–3. Control proceeds from a Start block to a block 910 in which the fax spoofer software 140 awaits initiation of a fax by a host application. If a fax has been initiated in a block 914, control proceeds to a block 915 in which the fax spoofer software 140 determines whether the associated fax/modem device 160 is busy. This determination of whether the fax/modem device 160 is busy may entail factors such as deciding whether the connection to the fax/modem device 160 is available, whether a non-standard communication link is being employed, or whether the fax/modem device 160 is engaged in other tasks, such as transmitting or receiving a fax, or serving as a modem to the computing system 110.

If the fax spoofer software 140 determines that the fax can not be transmitted to the fax/modem device 160 on a real time basis or the fax spoofer software 140 is configured to handle all faxes, control proceeds to a block 930 in which the fax spoofer software 140 initiates a fax spoofer emulation. Control then proceeds to a block 935 in which the fax spoofer software 140 determines whether the storage of the session should be made locally or in the fax/modem device 160. Based on this determination, control proceeds to either a block 940 or 945 in which the fax spoofer software 140 communicates with the application program and stores the fax session data as appropriate. After creating and storing a version of a facsimile session, control then proceeds to block 910 in which the fax spoofer software 140 resumes waiting for fax initiation.

If, in block 915, the fax/modem device 160 is not busy, control proceeds to a block 920 in which the fax spoofer software 140 determines whether any scheduling has been enabled. If the fax/modem device 160 and the computing system 110 are operating under a schedule, control proceeds to a block 925 in which the fax spoofer software 140 stores all of the sessions locally. The fax spoofer software 140 creates and stores a fax session for later transmission to the associated fax/modem device 160, as detailed above. Control then returns to block 910 in which the fax spoofer software 140 awaits fax initiation.

In the block 920, if the fax spoofer software determines that scheduling has not been initiated, control proceeds to a block 945 in which the fax spoofer software 140 simply stores the fax session in the fax spoofer software 140. Control then returns to block 910 in which the fax spoofer software 140 awaits fax initiation.

In the block 910, while awaiting an action, the fax spoofer software 140 may determine that the stored fax/modem sessions are to be transferred to the associated fax/modem device 160 according to a preset schedule, as indicated in a block 912. When transmission of the fax sessions is scheduled, control transfers to a block 955 in which the fax spoofer software 140 directs the transmission of any remaining previously stored sessions in the fax/modem device 160.

Control then proceeds to a block 960 in which the fax spoofer software 140 determines if any fax sessions are locally stored for transmission. If no sessions are currently stored for later transmittal, control returns to block 910 in which the fax spoofer software 140 enters a wait state as described above.

If stored fax sessions are available for transmission to the associated fax/modem device 160, control proceed from block 960 to a block 965 in which the fax spoofer software 140 sends a fax/modem session to the fax/modem device 160. If the session is transmitted successfully, as indicated in a block 975, then control proceeds to a block 980 in which the fax spoofer software 140 attempts to retrieve any other sessions present in the session buffer for transmittal to the fax/modem device 160. Control returns to the block 960 in which the fax spoofer software 140 determines whether another session is actually present in the host buffer.

If, in block 965 a stored fax/modem session is not correctly transmitted to the fax/modem device 160, as indicated by a block 970, control proceeds to a block 985 in which the fax spoofer software 140 logs an error. Control then proceeds to a block 955 in which the fax spoofer software 140 attempts to access and send the next stored session in the block. Thus, the fax spoofer software 140 communicates each of the fax/modem sessions to the fax/modem device 160 and continues until all of the stored sessions are transmitted.

Figure 10:
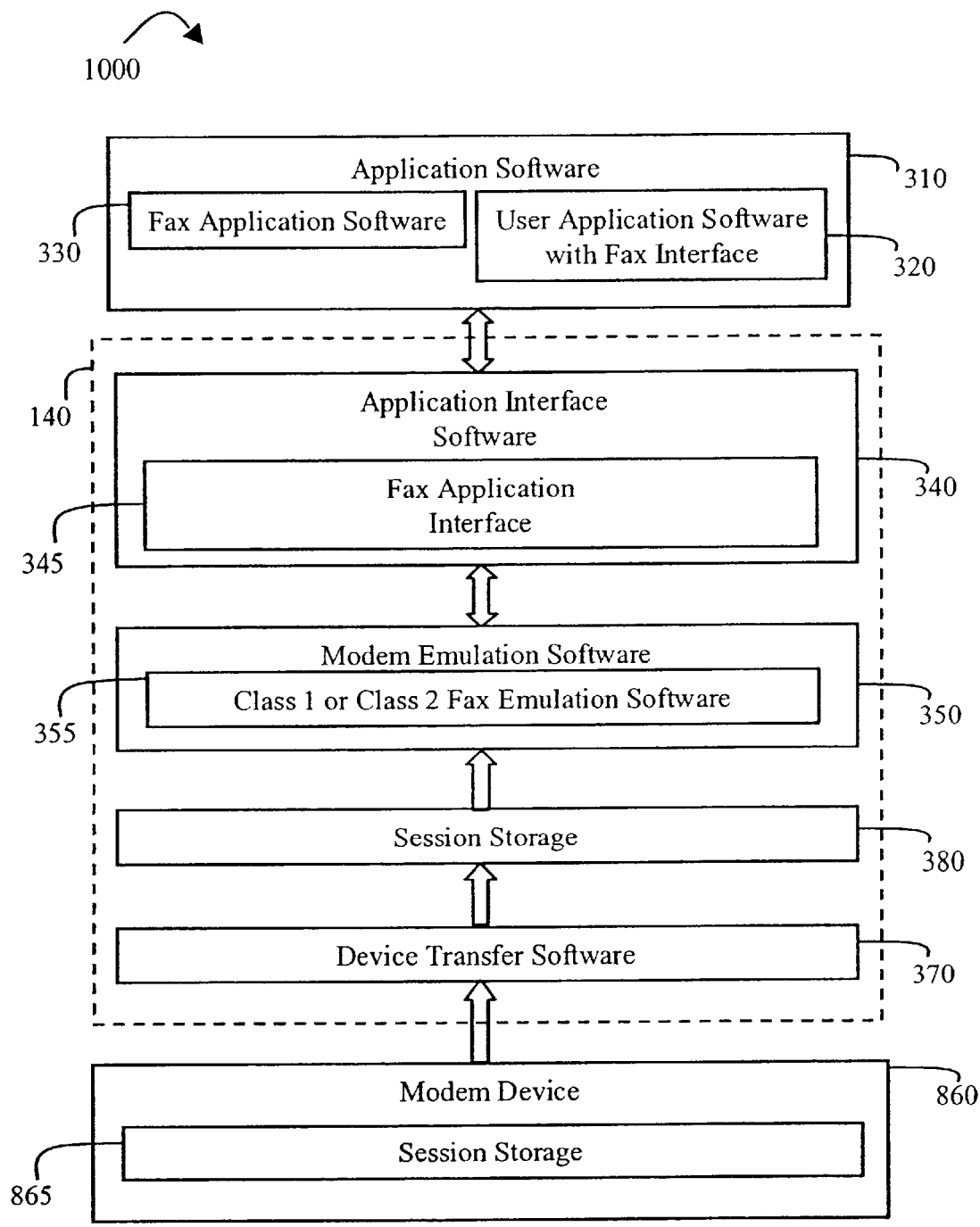
FIG. 10 is a combination flow diagram and functional block diagram describing the possible components of the fax spoofer software of FIG. 1 during the receipt of an incoming facsimile from a fax/modem device having its own session storage area.

FIG. 10 is a combination flow diagram and functional block diagram 1000 describing the possible components of the fax spoofer software 140 of FIGS. 1–3 during the receipt of an incoming facsimile from a fax/modem device having its own session storage area such as the fax/modem device 860 (FIG. 8). An incoming facsimile is detected by the fax/modem device 860. The fax/modem device 860 then initiates communication with the fax spoofer software 140.

If the computer device 110 is unable to initiate a direct link to an application software 310, the fax spoofer software 140 may relay the communication from the fax/modem device 860 through a device transfer software component 370 to a session storage 380. The fax spoofer software 140 may also direct the fax/modem device 860 to store the session in a fax/modem session storage area 365. Thus, the communication session is selectively routed to a particular session storage area.

At a later time, the fax spoofer software 140 is able to initiate full communication with the ultimate recipient of the facsimile, namely the application software 310, which again can be a facsimile application software component 330, or a user application software with fax interface component 320.

The fax spoofer software 140 communicates with the application software 310 via an application interface software component 340, described previously in relation to FIG. 3. A modem emulation software component 350 operates on fax/modem sessions stored in the session storage 380. To the application software 310, the modem emulation software appears to be an actual fax/modem device. Thus, the facsimiles stored in the session storage 360 are relayed to the recipient application software 310 in a dynamic, non-real time manner, without having the facsimile transmission fail due to the unavailability of system resources The session data is relayed to the modem emulation software 350 from the fax/modem session storage 365 on the fax/modem device 860. The fax spoofer software 140 can selectively direct the storage of fax sessions so as to minimize impact on either the computing system 110 or the fax/modem device 860, or both.

Figure 11:
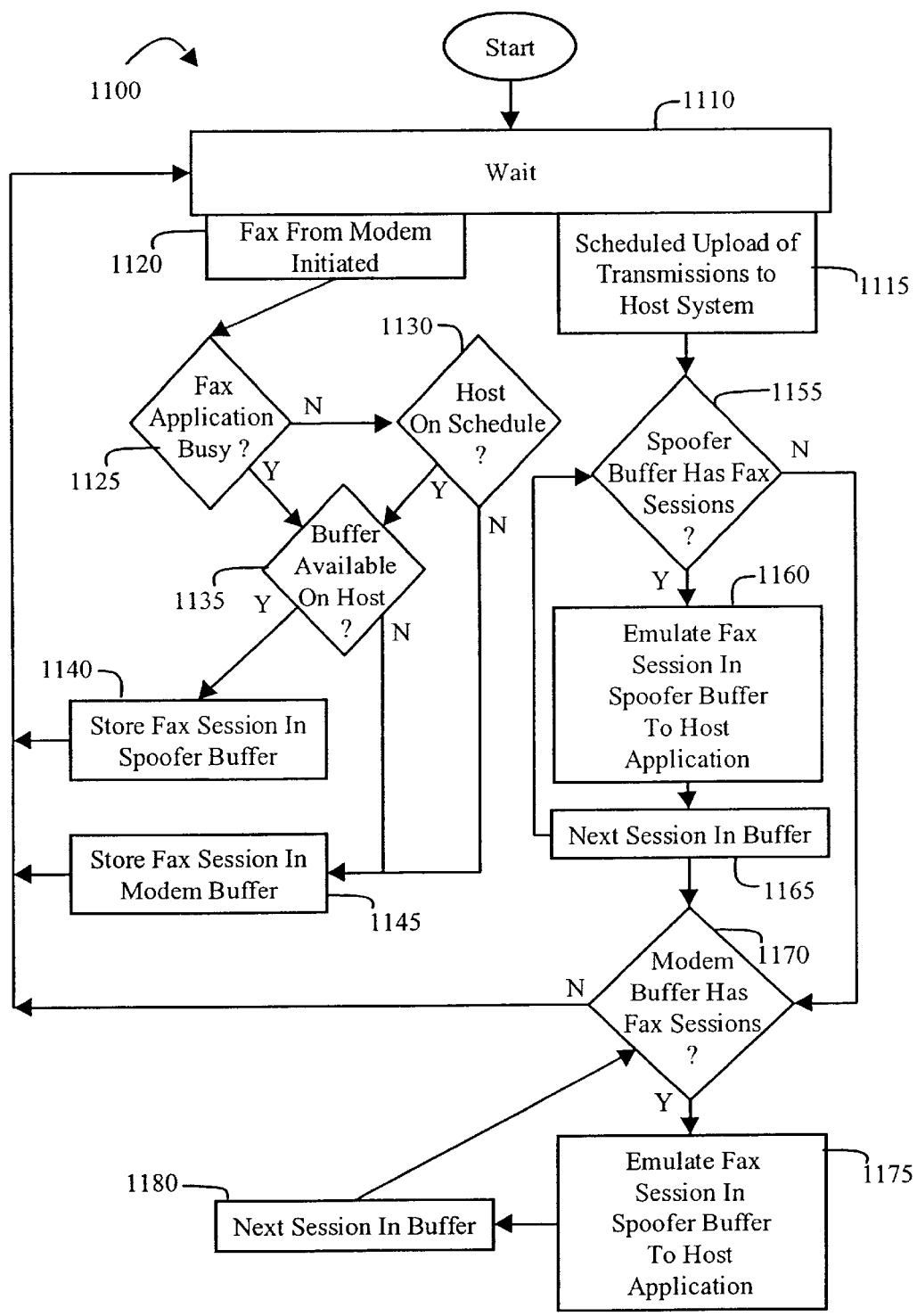
FIG. 11 is a data flow diagram of the possible operation of the fax spoofer system of FIG. 10.

FIG. 11 is a data flow diagram 1100 of the possible operation of the fax spoofer system 140 of FIGS. 1–3. Control proceeds form a Start block to a block 1110 in which the fax spoofer software 140 awaits initiation of a fax by the attached fax/modem device 860 (FIG. 8). Once the fax has been initiated, as indicated by a block 1120, control proceeds to a block 1125 in which the fax spoofer software 140 determines whether the associated computing device 110 is busy. This determination may entail deciding whether the connection to the fax/modem device 860 is available, whether a non-standard communication link is being employed, or whether the fax/modem device 860 is engaged in other tasks, such as transmitting or receiving a fax, or serving as a modem to the computing system 110.

If the fax spoofer software 140 determines that the fax can not be transmitted to the computing device 110 on a real time basis or the fax spoofer software 140 is configured to handle all faxes, control proceeds to a block 1135 in which the fax spoofer device 140 determines whether to buffer the incoming data on the host system or on the fax/modem device 860. Control then proceeds to either a block 1140 or a block 1145 depending upon the status of components of the computer system 110. Control then returns to block 1110 in which the fax spoofer software 140 awaits fax initiation.

In block 1125, if the fax/modem is not busy, control proceeds to a block 1130 in which the fax spoofer software 140 determines whether any scheduling has been initialized. If the fax/modem device 860 or computing system 110 are operating under a schedule, control again transfers to the block 1135 and then proceeds to either block 1140 or block 1145 in which the incoming data is stored, as appropriate. Control then returns to block 1110 and the fax spoofer software 140 returns to the wait state. In block 1130, if the fax spoofer software 140 determines that scheduling is not initiated, control proceeds to block 1145 in which the fax spoofer software 140 simply stores the fax session in the modem buffer 865 (FIG. 8).

While awaiting an action with control in block 1110, the fax spoofer software 140 may determine that the stored fax/modem sessions are to be transferred to the computing device 110 through the use of a preset schedule, as represented by a block 1115. When a transmission of the fax sessions is scheduled, control proceeds from block 1115 to a block 1155 in which the fax spoofer software determines if any fax sessions are stored for the computing system 110. If there are stored sessions, control proceeds to a block 1160 in which the stored sessions are processed through the emulation software and to the recipient application. Control then proceeds to a block 1165 in which the next session in the buffer is sought and then returns to block 1155.

If no sessions are currently stored in the session storage 260 (FIG. 2) associated with the fax spoofer software 140, control proceeds to a block 1170 in which the fax spoofer software 140 determines whether the fax/modem buffer has stored sessions from the fax/modem device 860. These sessions are processed in a manner similar to that described above in relation to fax sessions residing in a local buffer, as illustrated in a block 1175 and a block 1180. When all of the fax/modem stored sessions are processed, control returns to block 1110 in which the fax spoofer software 140 enters the wait state.

Fax/modem sessions may be stored for subsequent transmission in a multitude of scheduling schemes. Faxes may be scheduled or ordered by time, priority, or by a combination of these and other factors. Schedule disabling is available to limit fax usage of the computing device 110. For example, the computing system 110 and associated fax/modem device 160 or 860 may allocate five minutes per hour to send and receive faxes and may increase that amount after normal business hours have ended. If the stored sessions are not sent during the allocated time, the sessions remain in storage for transmission at a later time.

Schedules for messages of varying priority may also be defined. For example, high priority messages may be scheduled for transmission every half hour, while low priority messages may be scheduled to transmit every three hours. The fax spooling and scheduling features allow precise scheduling of outgoing faxes, while insuring that initiating applications will not be impeded by a lack of system resources.

Figure 12:
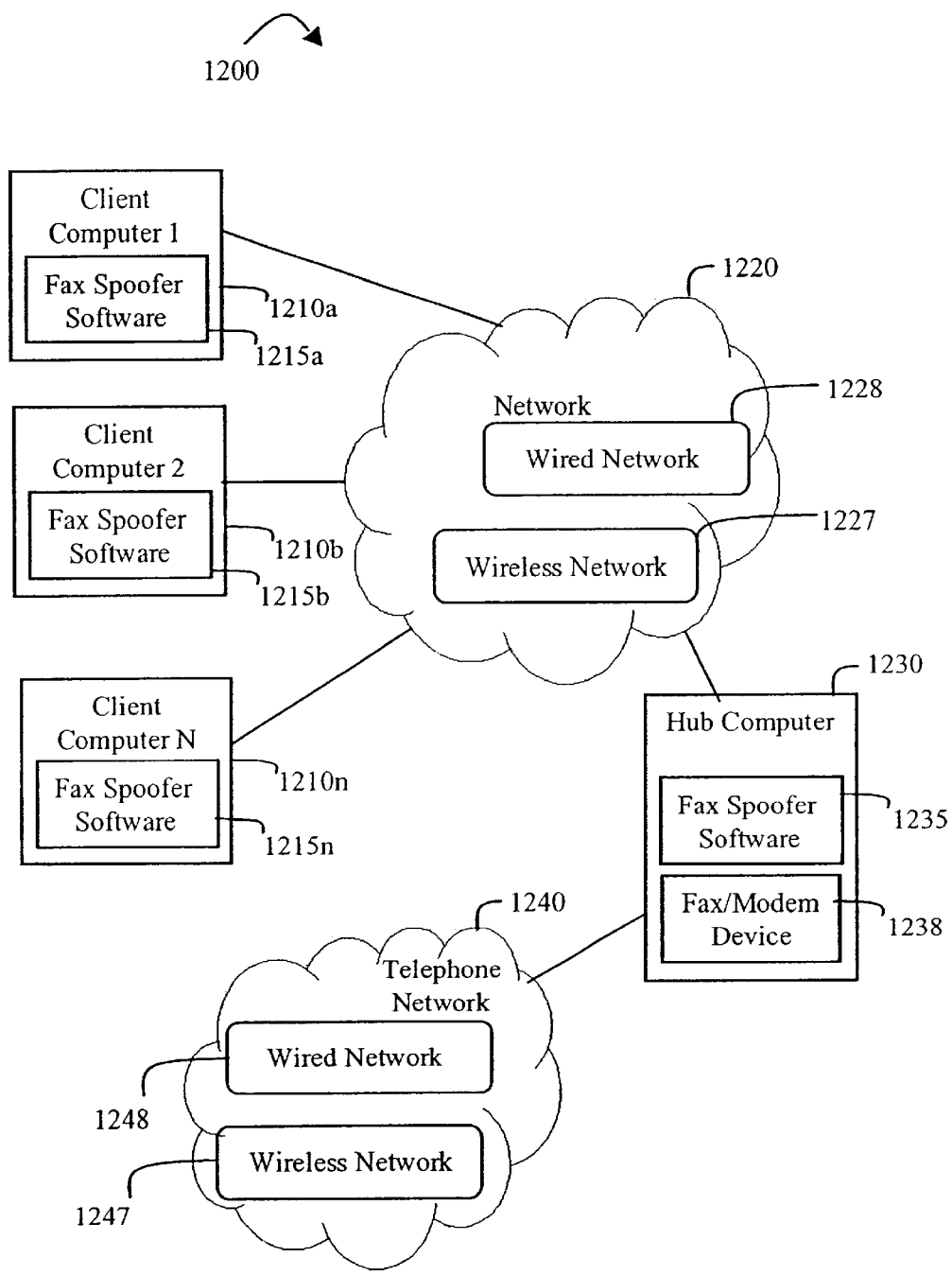
FIG. 12 is a schematic block diagram of the present invention in a network environment where a fax "hub" is created.

FIG. 12 is a schematic block diagram 1200 of the present invention in a network environment where a fax "hub" is created. A "Client Computer 1", a "Client Computer 2", through a "Client Computer N" (1210*a*, 1210*b*, and 1210*n*, respectively) each contain portions of the fax spoofer software (1215a, 1215b and 1215n, respectively) described in the preceding figures. Through this interlinking of computer systems, a fax "hub" system can be created to serve a multitude of individual computers.

For example, when the "Client Computer 1" 1210a attempts to send a facsimile to a remote party, the "Client Computer 1" 1210a may process the outgoing facsimile through the interface and emulation portions contained in the resident fax spoofer software component 1215a. The fax spoofer software 1215a stores the outgoing sessions either locally in the "Client Computer 1" 1210a or may transmit such a session across a network 1220 to a fax hub computer 1230.

The fax hub computer 1230 may contain portions, either in whole or in part, of a fax spoofer software component 1235 as described in the previous figures. The session may be stored by the fax hub computer 1230 in a memory associated with the fax spoofer software 1235, within a fax/modem device 1238, or within the resident fax spoofer software 1215a. A scheduling mechanism, described above in detail, may exist on either the "Client Computer 1" 1210a or on the fax hub computer 1230.

A multitude of client computers, for example, "Client Computer 2" 1210b through "Client Computer N" 1210n, representing any number of attached computers, may also be connected to the fax hub computer 1230 via a network 1220. Accordingly, an entire system of non-real time fax transmissions may be initiated for multiple computers across network connections, or across other communications interfaces. Thus, the fax hub computer 1230 may act as a centralized point of contact with a telephone network.

This arrangement alleviates interruptions in the transmission of faxes via fax/modems on each individual client computer. Additionally, should the network connection to the fax hub computer 1230 become congested for whatever reason, storage and/or emulation may occur in the client computers, thereby avoiding additional problems and delays. In addition, a delay of the transmission may be desirable because outside lines are at a premium.

Both incoming and outgoing facsimile transmissions can be processed over the network 1220 in a manner substantially similar to that described above in the preceding figures in relation to a single computing device. Storage, processing or any combination thereof, of incoming and outgoing transmissions may take place on the network-based spoofer system. This enhances efficient usage of the modem fax device 1238, and allows for efficient scheduling and communication queuing for the associated client computers on the network 1220.

Both the operation of the fax hub spoofer 1235 and the fax client computers may be implemented through methods similar to those described in FIGS. 2–11 above. As shown, the networked spoofer software may operate across any wired or wireless network, which includes Wide Area Networks (WAN's), Local Area Networks (LAN's) and the Internet.

Thus, a dynamic buffering, queuing and spooling system is described for the non real-time transmission and receipt of facsimiles. The non-real time fax transmission and reception system may be implemented on a single, stand-alone computing device or in conjunction with a networked environment, thus creating a multi-user modem interface for a computer network. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A facsimile transmission system for a computer system communicatively coupled to a modem capable of acting as a facsimile device, the facsimile transmission system comprising:

a computer system interface, communicatively coupled to the computer system, that receives data for an outgoing facsimile transmission through the modem;

a modem emulator, communicatively coupled to the computer system, that receives data from the computer system for transmission as a facsimile through the modem;

a modem interface, communicatively coupled to the modem emulator, that passes the data received and stored by the modem emulator to the modem; and the modem emulator emulating the modem to the computer system when the computer system requests to send a facsimile through the modem.

2. The fax transmission system of claim 1 further comprising a facsimile session queue, communicatively coupled to the modem emulator, that stores the data received from the computer system for transmission.

3. The fax transmission system of claim 1 further comprising a scheduler, communicatively coupled to the modem interface, that sends the data received from the computer system to the modem based on a preselected criteria.

4. The fax transmission system of claim 3 wherein the preselected criteria is a number of facsimile messages to be sent.

5. The fax transmission system of claim 4, further comprising a facsimile session queue, communicatively coupled to the modem emulator, that stores the data received from the computer system for transmission, and wherein the preselected criteria is an amount of storage space in the session queue for the received data.

6. The fax transmission system of claim 3, wherein the preselected criteria is a set time.

7. The fax transmission system of claim 1, wherein the modem emulator comprises a class 1 facsimile machine emulator.

8. The fax transmission system of claim 1, wherein the modem emulator comprises a class 2 facsimile machine emulator.

9. The fax transmission system of claim 1, wherein the modem emulator stores the data when the modem is otherwise occupied.

10. The fax transmission system of claim 1 wherein the modem emulator transmits the data to the modem at a later time than it receives the data from the computer system.

11. The fax transmission system of claim 1, wherein the modem stores incoming data from other facsimile devices, and the modem emulator emulates a modem upon that data in communicating that data from other facsimile to the computer system.

12. A method of operating a facsimile device on a computing system, the computing system communicatively coupled to a modem, the method comprising:

receiving a request to transmit a facsimile from the computing system;

checking the availability of the modem to transmit the facsimile;

emulating a modem to computing system; and transmitting the facsimile at a later time.

13. The method of claim 12, the step of checking comprising:

checking a scheduler to determine if the modem can send the facsimile at the time of requesting.

14. The method of claim 12 further comprising a step of receiving and storing the facsimile data in a session buffer.

15. The method of claim 12 further comprising scheduling the step of transmitting based upon a preselected criteria.

16. The method of claim 12, wherein the modem is communicatively coupled to the computing system over a network.

* * * * *